United States Patent
Huang

(10) Patent No.: US 8,982,951 B2
(45) Date of Patent: Mar. 17, 2015

(54) ADAPTIVE MOTION ESTIMATION CODING

(75) Inventor: Yu-Wen Huang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1803 days.

(21) Appl. No.: 12/045,657

(22) Filed: Mar. 10, 2008

(65) Prior Publication Data

US 2009/0226105 A1 Sep. 10, 2009

(51) Int. Cl.
*H04N 7/12* (2006.01)
*H04N 19/587* (2014.01)
*H04N 19/139* (2014.01)
*H04N 19/176* (2014.01)
*H04N 19/61* (2014.01)
*H04N 19/132* (2014.01)
*H04N 19/142* (2014.01)
*H04N 19/53* (2014.01)
*H04N 19/57* (2014.01)

(52) U.S. Cl.
CPC ........... *H04N 19/587* (2014.11); *H04N 19/139* (2014.11); *H04N 19/176* (2014.11); *H04N 19/61* (2014.11); *H04N 19/132* (2014.11); *H04N 19/142* (2014.11); *H04N 19/53* (2014.11); *H04N 19/57* (2014.11)
USPC ...................................... 375/240.16; 704/500

(58) Field of Classification Search
CPC ..................................................... H04N 7/014
USPC ............................... 375/240.16; 348/459, 699
See application file for complete search history.

(56) References Cited

U.S. PATENT DOCUMENTS

| | | | |
|---|---|---|---|
| 5,978,819 A | 11/1999 | Berstis | |
| 7,215,384 B2 * | 5/2007 | McVeigh et al. | 348/699 |
| 7,835,438 B2 | 11/2010 | Chono | |
| 2005/0013365 A1 * | 1/2005 | Mukerjee et al. | 375/240.16 |
| 2005/0105618 A1 * | 5/2005 | Booth et al. | 375/240.16 |
| 2006/0159174 A1 * | 7/2006 | Chono | 375/240.16 |
| 2009/0161011 A1 * | 6/2009 | Hurwitz et al. | 348/459 |

FOREIGN PATENT DOCUMENTS

| | | |
|---|---|---|
| CN | 1127696 C | 11/2003 |
| CN | 1645938 A | 7/2005 |
| CN | 1691782 A | 11/2005 |
| CN | 1823531 A | 8/2006 |

* cited by examiner

*Primary Examiner* — Dang Ton
*Assistant Examiner* — Lionel Preval
(74) *Attorney, Agent, or Firm* — Winston Hsu; Scott Margo

(57) ABSTRACT

A method for encoding a video signal comprising a plurality of reference frames and non-reference frames includes: for a non-reference frame to be encoded, determining if at least a portion of a reference frame that is a backward reference frame of the non-reference frame has no scene change; and when the portion of the reference frame has no scene change, scaling down a search range for block matching of the portion of the non-reference frame.

14 Claims, 4 Drawing Sheets

ADAPTIVE MOTION ESTIMATION CODING

BACKGROUND

The present invention relates to block matching motion estimation coding, and more particularly, to adaptive ways of performing block matching motion estimation to save computation power.

Modern video coding techniques utilize predictive coding for coding frames of a video. One of the most common techniques is block-based motion estimation coding. When a current macroblock of a frame is being coded, data from previous frames/macroblocks are searched to find a best match for the current macroblock.

Motion estimation is complex, however, and can consume more than 90% of computation and power of the encoding process. Methods for reducing the computation complexity for motion estimation are therefore essential for future development of encoding systems.

SUMMARY

It is therefore an objective of the present invention to provide a plurality of methods for performing block matching motion estimation with reduced computation complexity.

A method for encoding a video signal comprising a plurality of reference frames, and non-reference frames according to a first embodiment of the present invention comprises: analyzing motion vectors of at least a portion of a first reference frame that is a backward reference frame for a non-reference frame; when the motion vector statistics are less than or equal to a preset threshold, determining a reference frame that is close to the non-reference frame; and duplicating at least a portion of the determined reference frame as at least a portion of the non-reference frame.

A method for encoding a video signal comprising a plurality of reference frames and non-reference frames according to a second embodiment of the present invention comprises: for a non-reference frame to be encoded, determining if at least a portion of a reference frame that is a backward reference frame of the non-reference frame has no scene change; and when the portion of the reference frame has no scene change, scaling down a search range for block matching of the portion of the non-reference frame.

A method for encoding a video signal comprising a plurality of video frames according to a third embodiment comprises: down-scaling data of at least a portion of a first video frame with a scaling factor; determining motion information of the down-scaled video frame; and utilizing the motion information of the down-scaled video frame to scale down a search range for the video frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
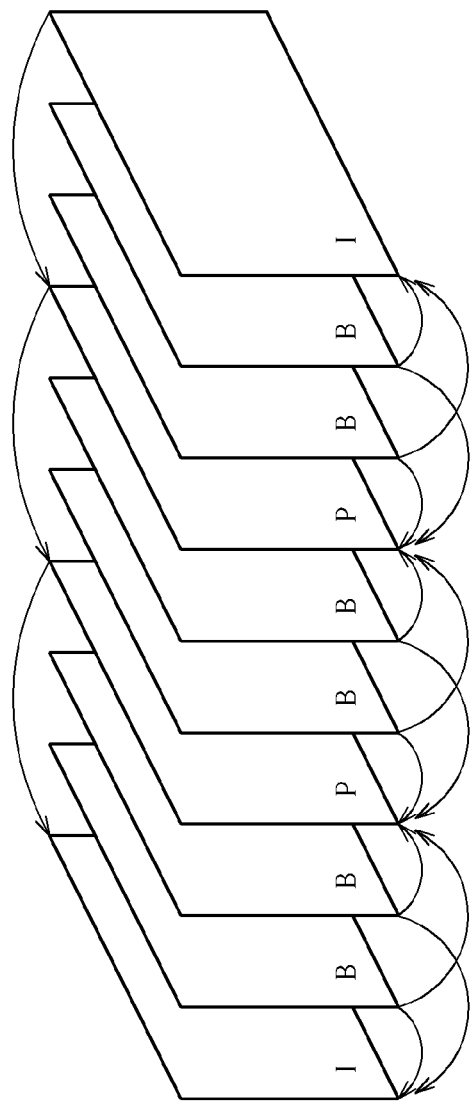
FIG. 1 is a diagram of a plurality of video frames comprising I frames, P frames and B frames.

Please refer to FIG. 1. FIG. 1 is a diagram of a plurality of frames in a video signal, comprising reference frames and non reference frames. Intra (I) frames and predictive (P) frames in the MPEG-2 standard are defined as reference frames, and bi-directional prediction (B) frames are defined as non-reference frames. In some other coding standards, such as H.264, B frames are also allowed to be reference frames for other frames. FIG. 1 shows B frames dependency on I frames and P frames as reference frames. As is well known in the art, when coding the plurality of frames, the encoding order (with reference to the frames shown in FIG. 1) is: I, P, B, B, P, B, B, I, B, B. In other words, the first P frame in FIG. 1 is a backward reference frame for the first two B frames.

When all or most of the motion vectors of the first P frame are equal to zero or substantially zero and there is no scene change, this first P frame is almost stationary, and the two B frames displayed before the first P frame are very likely to be stationary too, hence it is reasonable to copy either the first I frame or the first P frame as the B frames. The encoding system can bypass one or more coding stages for the B frames that utilize the P frame as the reference frame, where the coding stages that can be bypassed are motion estimation (ME), discrete cosine transform (DCT), quantization (Q), inverse quantization (IQ), and inverse DCT (IDCT). In an embodiment, the first B frame can be copied from the first I frame and the second B frame can be copied from the first P frame, or both B frames can be duplicated as either the first I frame or the first P frame. These modifications all fall within the scope of the present invention, and it can be appreciated by those skilled in the art that selection of each modification is according to the frame setup.

During coding, motion vectors of each frame are determined. When coding a B frame, the system first checks if a predetermined condition is satisfied (motion vector statistics of a P backwards reference frame is substantially zero or below a threshold, and there is no scene change). When this is true, a prediction direction for the B frame is set, either towards the P backwards reference frame or towards a nearest I/P frame, and motion vectors of the B frame and the coded block pattern (CBP) are set to zero. Therefore, although a same number of frames are generated as in conventional systems, some of the B frames are copied from existing I or P frames without the need for complicated coding computation.

A further modification of the first embodiment involves partitioning each frame and applying the adaptive reduction in computation on the partitions independently. In a situation where motion only occurs in a specific area of a P frame, the remaining areas are considered as stationary, areas of a B frame corresponding to the stationary area can be copied from the I frame of a P frame close to the B frame, and the partition with motion can be coded independently. This also saves significantly on computation time.

Figure 2:
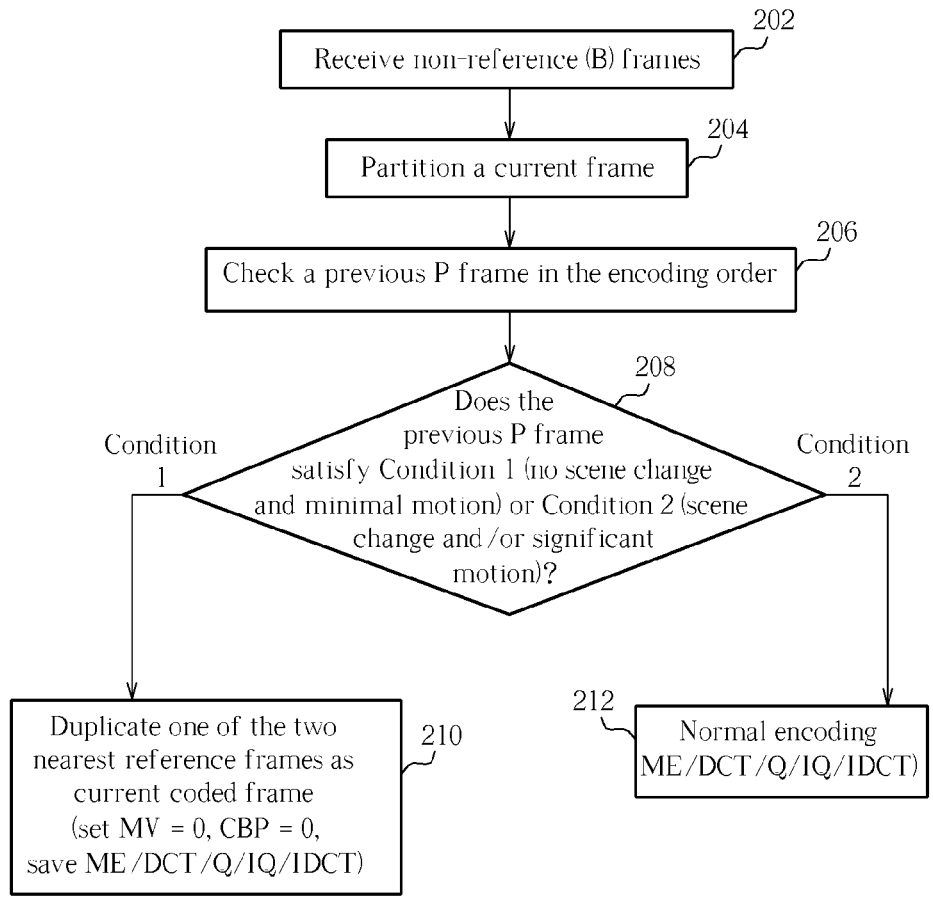
FIG. 2 is a diagram of a flowchart detailing steps of the method according to a first embodiment of the present invention.

Please refer to FIG. 2. FIG. 2 is a flowchart detailing steps of the method of the first embodiment. Please note that Step 204 is optional. The steps are as follows:

Step 202: Receive non-reference (B) frames;
Step 204: Partition a current frame;
Step 206: Check a previous P frame in the encoding order;
Step 208: Does the previous P frame satisfy Condition 1 (no scene change and minimal motion) or Condition 2 (scene change and/or significant motion)? If Condition 1 go to Step 210; if Condition 2 go to Step 212;

Step 210: Duplicate one of the two nearest reference frames as current coded frame (set MV=0, CBP=0, save ME/DCT/Q/IQ/IDCT);

Step 212: Normal encoding (ME/DCT/Q/IQ/IDCT).

A second embodiment of the present invention aims to utilize motion vectors of the P frames for adjusting search ranges for corresponding B frames. If a backward reference P frame for a B frame has no scene change but has some motion, when coding the B frame, the motion vector of the P frame can be utilized to scale down a search range for the B frame. For example, if the P frame contains a moving object, by assuming the object moves at a constant speed along a fixed direction, a motion vector for the B frame can be considered to be a factor of the motion vector of the P frame. Taking the frames in FIG. 1 as an example, if a motion vector of the first P frame is [6,−12], assuming constant speed, the corresponding forward and backward motion vectors of the first B frame are [2,−4] and [−4,8] respectively, and the corresponding forward and backward motion vectors of the second B frame are [4,−8] and [−2,4] respectively. In some embodiments, a maximum motion vector in the P frame is used as a target motion vector, for example, a target forward motion vector of the first P frame is 60, a target motion vector of the first B frame is 20, derived by 60 multiplied by a scaling factor ⅓, and a target forward motion vector of the second B frame is 40, derived by 60 multiplied by a scaling factor ⅔. The scaling factor of a particular B frame is derived from a number of B frames between the nearest I and P frames and the relative displaying order of the particular B frame. A search range for each B frame can be scaled accordingly. For example, the search range of forward prediction for the first and second B frames are scaled down from a standard search size to ±30 (slightly greater than 20) and ±50 (slightly greater than 40) respectively.

Furthermore, the partition method detailed above can also be applied to the second embodiment of the present invention. This is particularly appropriate when frames are encoded in macroblocks. Each macroblock may have a different motion vector, and therefore by applying adaptive reduction in the search range, only certain macroblocks require a relatively large search range.

Figure 3:
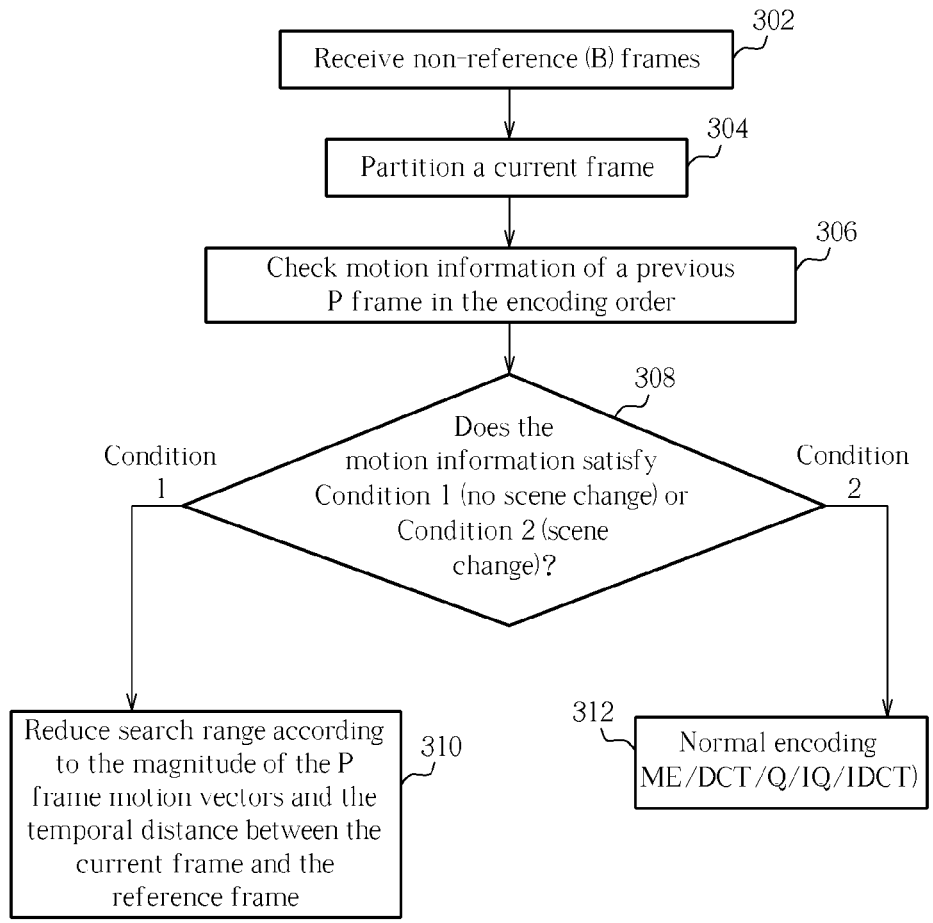
FIG. 3 is a diagram of a flowchart detailing steps of the method according to a second embodiment of the present invention.

Please refer to FIG. 3. FIG. 3 is a flowchart detailing steps of the method according to the second embodiment of the present invention. Please note that Step 304 is optional. The steps are as follows:

Step 302: Receive non-reference (B) frames;
Step 304: Partition a current frame;
Step 306: Check motion information of a previous P frame in the encoding order;
Step 308: Does the motion information satisfy Condition 1 (no scene change) or Condition 2 (scene change)? If Condition 1 go to Step 310; if Condition 2 go to Step 312;
Step 310: Reduce search range according to the magnitude of the P frame motion vectors and the temporal distance between the current frame and the reference frame;
Step 312: Normal encoding (ME/DCT/Q/IQ/IDCT).

A third embodiment of the present invention can be utilized for both B frames and P frames. Instead of utilizing the predetermined search range for block matching, the search ranges can be scaled down by deriving motion information from a down-scaled frame. When the frame is down-scaled by multiplying a scaling factor, a coarse search can be performed to derive motion vectors and other motion information, and this motion information is utilized to determine the size of an appropriate search range. For example, when a maximum motion vector for a down-scaled frame is found as the motion information, the maximum motion vector of the original size frame is determined by dividing the scaling factor. The search range can therefore be set according to the determined maximum motion vector of the original size frame, either equal to or slightly greater than the determined maximum motion vector. Obviously, if this method is constantly applied there will be some reduction in quality of the video, therefore the method can be selectively applied according to overhead versus quality requirements.

As in the first and second embodiments detailed above, the third embodiment of the present invention can also utilize the partition scheme, for adaptively reducing the search range of some macroblocks of a current frame according to the disclosed method, and coding other macroblocks of the current frame according to conventional methods.

Figure 4:
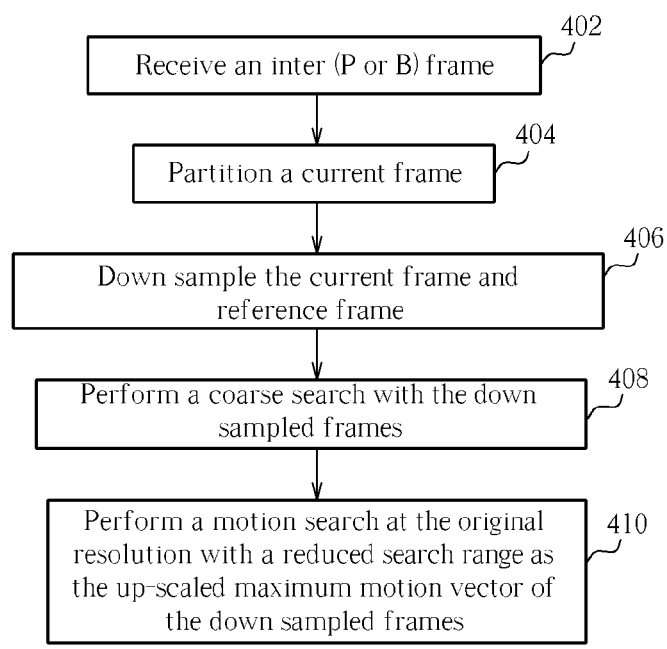
FIG. 4 is a diagram of a flowchart detailing steps of the method according to a third embodiment of the present invention.

Please refer to FIG. 4. FIG. 4 is a flowchart of the method according to the third embodiment of the present invention. Please note that Step 404 is optional. The steps are as follows:

Step 402: Receive an inter (P or B) frame;
Step 404: Partition a current frame;
Step 406: Down sample the current frame and reference frame;
Step 408: Perform a coarse search with the down sampled frames;
Step 410: Perform a motion search at the original resolution with a reduced search range as the up-scaled maximum motion vector of the down sampled frames.

It should also be noted that the second embodiment and the third embodiment methods can be applied at the same time. If a P frame is down-scaled, and a down-scaled motion vector is obtained, assuming the object in the P frame moves at constant speed, the down-scaled motion vector for B frame(s) using the P frame as a backward reference frame can be interpolated according to the down-scaled motion vector of the P frame and a displaying order of the B frame(s).

The present invention provides a plurality of methods for saving computation power when coding video frames. By determining motion information of a backward reference frame, at least a portion of the non-reference frames can be adaptively copied, and search ranges for at least a portion of the non-reference frames can be adaptively scaled. Furthermore, by down-scaling the video frame, the down-scaled motion information of the video frames can be utilized to adaptively scale search ranges. The present invention therefore provides highly efficient and cost effective methods for coding data.

Those skilled in the art will readily observe that numerous modifications and alterations of the device and method may be made while retaining the teachings of the invention.

What is claimed is:

1. A method for encoding a video signal comprising a plurality of reference frames, and non-reference frames, the method comprising:
   analyzing motion vectors of at least a portion of a first reference frame only without analyzing motion vectors of non-reference frames, the first reference frame being a backward reference frame for a non-reference frame;
   when motion vector statistics of the motion vectors are less than or equal to a preset threshold, determining a reference frame that is close to the non-reference frame; and
   duplicating at least a portion of the determined reference frame as at least a portion of the non-reference frame.

2. The method of claim 1, wherein the step of duplicating the determined reference frame as the non-reference frame further comprises:

duplicating the determined reference frame for a plurality of non-reference frames that utilize the first reference frame as a backward reference frame.

3. The method of claim 2, wherein the determined reference frame comprises the first determined reference frame and a second determined reference frame, and the step of duplicating the determined reference frame for a plurality of non-reference frames further comprises:
    duplicating the first determined reference frame as some of the plurality of non-reference frames; and
    duplicating the second determined reference frame as remaining frames of the plurality of non-reference frames.

4. The method of claim 1, further comprising:
    setting all motion vectors of the non-reference frame to zero.

5. The method of claim 1, wherein the step of duplicating a portion of the determined reference frame as a portion of the non-reference frame comprises:
    setting a prediction direction of the portion of the non-reference frame toward the determined reference frame, and setting motion vectors and coded block patterns corresponding to the portion of the non-reference frame to zero.

6. A method for encoding a video signal comprising a plurality of reference frames and non-reference frames, the method comprising:
    for a non-reference frame to be encoded, determining if at least a portion of a reference frame that is a backward reference frame of the non-reference frame has no scene change by analyzing the reference frame only, without analyzing motion vectors of the non-reference frame; and
    when the portion of the reference frame has no scene change, scaling down a search range for block matching of the portion of the non-reference frame.

7. The method of claim 6 wherein the step of scaling down a search range comprises:
    determining a target motion vector of the reference frame based on motion vector statistics;
    calculating a target motion vector of the non-reference frame by multiplying a scaling factor with the target motion vector of the reference frame; and
    scaling down the search range according to the target motion vector of the non-reference frame.

8. The method of claim 7, wherein the reference frame is a backward reference frame of a plurality of non-reference frames and the step of calculating a target motion vector of the non-reference frame comprises:

deriving a scaling factor for each non-reference frame according to a number of non-reference frames and a displaying order relative to the reference frame.

9. The method of claim 6, wherein the step of scaling down a search range for block matching of the non-reference frame comprises:
    dividing the non-reference frame into partitions; and
    independently scaling down the search range for each partition.

10. A method for encoding a video signal comprising a plurality of video frames, the method comprising:
    down-scaling data of at least a portion of a first video frame only with a scaling factor;
    determining motion information of the down-scaled video frame only; and
    utilizing the motion information of the down-scaled video frame to scale down a search range for the video frame without reference to motion information of other video frames.

11. The method of claim 10, further comprising:
    performing a coarse search on the down-scaled video frame to determine the motion information of the down-scaled video frame.

12. The method of claim 11, wherein the step of performing the coarse search comprises: further determining a maximum motion vector of the down-scaled video frame as the motion information; and
    scaling down the search range according to the determined maximum motion vector and the scaling factor.

13. The method of claim 12, wherein the first video frame is a backward reference frame of a plurality of non-reference frames and the method further comprises:
    deriving a target motion vector for each non-reference frame in accordance with the maximum motion vector of the down-scaled video frame and a displaying order of each non-reference frame; and
    scaling down a search range for each of the non-reference frames according to the target motion vector of each non-reference frame.

14. The method of claim 10, wherein the step of utilizing the motion information of the down-scaled video frame to scale down a search range for the video frame comprises:
    dividing the video frame into partitions; and
    independently scaling down the search range for each partition according to the motion information of the corresponding partition.

* * * * *